3,413,148
POLYETHYLENE LUBRICATED
ENAMELED WIRE
Frank A. Sattler, Monroeville, and Jack Swiss, Murrysville, Pa., assignors to Westinghouse Electric Corporation, Pittsburgh, Pa., a corporation of Pennsylvania
Filed June 18, 1964, Ser. No. 376,206
7 Claims. (Cl. 117—218)

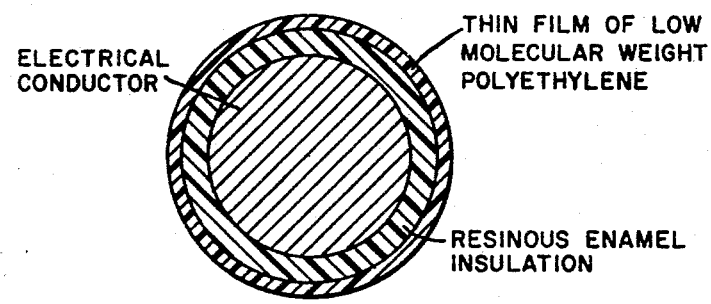

ABSTRACT OF THE DISCLOSURE

A thin continuous or discontinuous film of low molecular weight polyethylene is applied to resin insulated or enameled wire to reduce the damage to the resin insulation from automatic winding machines.

---

This invention relates, in general, to resin insulated electrical conductors and, more specifically, to the treatment of resin insulated or enameled wires to reduce the damage to the insulation during automatic winding.

In automatic winding machines, resin insulated or enameled wires are rapidly wound into electrical equipment. In such machines, however, the enameled wires are subjected to severe mechanical abrasion and stretching strains. The resinous insulating or enamel coating is frequently damaged in such operations. These damaged areas are known as flaws or faults and the number of flaws in a length of wire may be measured by running the wire through an electrically conductive bath with a voltage impressed across the insulating film and a counter to measure the number of shorts or flaws in the wire coating.

Resinous insulating or enamel coatings have been specifically formulated to have excellent flexibility adhesion, toughness and abrasion resistance when deposited and cured on wire in the form of thin enveloping films. Nonetheless, these enamel coatings are damaged in automatic winding operations. Some improvement in the resistance to such abuse may be attained by adding an additional layer or overcoating of enamel but this also produces an undesirable increase in thickness. The increase in thickness is multiplied by the number of turns of wire wound into the equipment, and the additional total thickness may exceed the spatial limitations imposed by the equipment design. Mineral oil has been wiped onto enameled wires to act as a lubricant, with some limited success in reducing the damage from automatic winding but the oil film may interfere with subsequent varnish treatment of the wound electrical equipment.

Accordingly, it is an object of this invention to provide enameled wire having an improved resistance to damage in automatic winding machines.

Another object of this invention is to provide enameled wire with a very thin spatially insignificant lubricating film which will significantly decrease the number of flaws or shorts produced on enameled wire in automatic winding machines.

A further object of this invention is to provide a simple improved method of lubricating enameled wire to improve the resistance of the enameled coating to damage from automatic winding machines.

For a better understanding of the invention, reference may be had to the accompanying drawing which is a cross-sectional illustration of a lubricated insulated electrical conductor in accordance with the invention.

We have now discovered that a very thin film of low molecular weight polyethylene may be applied to enameled wire as a lubricant from a low concentration solution or suspension. The molecular weight of the polyethylene should be in the range of about 1,000 to 12,000 and preferably on the order of 1,500. The solvent for the polyethylene may be an aliphatic or aromatic hydrocarbon in the boiling range of about 80–150° C., which would include such solvents as the isomers of heptane (78–98° C.), octane (99–126° C.), nonane (133–150° C.), benzene (80° C.), toluene (111° C.) and the xylenes (138–144° C.).

The solubility of the described low molecular weight polyethylene is quite low, in the order of 3 to 4 percent by weight, in toluene and lower yet in n-heptane. The enameled wire is passed through a saturated solution or over a felt pad saturated with such a solution. The solvents are sufficiently volatile so that they evaporate at room temperature. The concentration of the polyethylene may be somewhat greater than its solubility in the solvent so that a suspension, rather than a true solution, is produced and the enameled wire may be coated with the suspension with equally satisfactory results. From about 1 to 8 percent of the low molecular weight polyethylene, by weight, may be employed in the solvent and it should be understood that this range will cover both solutions and suspensions. The film thickness of the polyethylene is less than 0.05 mil. No measurable practical minimum can be established, although any thickness, however small, will lubricate the enameled wire.

It should be understood that a continuous coherent enveloping film is not required, although it is preferred. Even a discontinuous film will act as a lubricant in the automatic winding machines and reduce the damage to the enamel coating.

In order to further illustrate the invention, the following specific examples are presented. These examples should be considered as specific illustrations of the invention and not as limitations.

One gram of a polyethylene powder having a molecular weight of 1,500 is dissolved and suspended in 100 grams of n-heptane by adding the powder to boiling heptane and then cooling to room temperature with rapid stirring. This "solution," which contains polyethylene both in suspension and solution, is employed as outlined in the tests hereinbelow.

Four samples of No. 17 AWG copper wire were employed each insulated with a resinous enamel commonly employed on wires. Sample A was insulated with a coating of polyvinyl acetal, sample B with an aromatic polyimide, sample C with epoxy, sample D with a polyurethane and sample E with a polyester. Approximately one-half of each of the foregoing samples was treated with mineral oil by running the sample over a felt pad saturated with the oil. The remaining part of each sample was treated with the described polyethylene solution in a similar manner. All of the samples were employed in a vertical automatic winding machine to wind fractional horsepower motor stators. After the stators were wound, the enameled wire was carefully removed and tested to determine the number of shorts that were present. The number of flaws was determined by running the wire samples through a salt water bath with 90 volts impressed across the insulating film and a counter to record the number of flaws or shorts.

The results, presented in the table below, indicate a marked improvement in reducing the number of shorts or flaws. The flaw count is reduced by a factor varying from about 22 to 70 percent. Moreover, the lubricating polyethylene film has no tendency to splatter as the mineral oil film sometimes does.

FLAW COUNT OF WIRES REMOVED FROM AUTOMATICALLY WOUND STATORS

| Enamel sample | Relative number of winding flaws | |
|---|---|---|
| | Mineral oil | Polyethylene |
| A | 100 | 65 |
| B | 76 | 59 |
| C | 235 | 70 |
| D | 155 | 81 |
| E | 144 | 120 |

In the foregoing examples, the solvent was sufficiently volatile to evaporate at room temperature. An additional treatment, that of passing the polyethylene lubricated wire through a heating tower after the solution is applied, may be employed so that higher boiling solvents or suspension mediums may be employed. A pass through a 15 foot vertical enameling tower at a hot spot temperature of 430° C. is sufficient to evaporate higher boiling aromatic solvents having boiling ranges as high as 280° C.

The tower pass may be advantageously employed with the lower boiling solvents in order to reduce the possibility of solvent crazing where a particular enamel coating may be susceptible to some of the more active solvents. The tower pass may also be employed to give the lubricated wire a better appearance and a more uniform cohesive film when the polyethylene film has a powdery appearance. The tower treatment is sufficient to fuse the film and give a more uniform appearance. It should be understood, of course, that the tower pass and fusion are not necessary to attain the advantages of this invention.

We claim:

1. An insulated electrical conductor comprising, in combination, an electrically conductive metallic wire, at least one resinous enamel coating deposited over said wire as electrical insulation and a film consisting essentially of polyethylene deposited on the enamel coating, the polyethylene having a molecular weight of from about 1,000 to 12,000, the film thickness being less than about 0.05 mil.

2. A lubricated enameled wire comprising, in combination, an electrically conductive metallic wire, a resinous enamel insulating coating deposited over said wire and a lubricating film having a thickness up to 0.05 mil and consisting essentially of polyethylene having a molecular weight from about 1,000 to 12,000 deposited onto the insulating coating.

3. The enameled wire of claim 2 in which the polyethylene has a molecular weight in the order of about 1,500.

4. The wire of claim 2 wherein the resinous enamel is selected from the group of resins consisting of polyvinyl acetal, aromatic polyimide, epoxy, polyurethane and polyester resins.

5. A method of lubricating resinous enameled electrical wire conductors comprising the steps of contacting the resinous surface of the enameled conductor with a solution consisting essentially of a volatile solvent and from about 1 to 8 percent by weight, of a polyethylene having a molecular weight of from about 1,000 to 12,000 and evaporating the solvent so that a film of the polyethylene is deposited on the surface.

6. The method of claim 5 in which the solvent is selected from the group consisting of aliphatic and aromatic hydrocarbon having a boiling range of about 80 to 150° C.

7. The method of claim 5 wherein the resinous enamel is selected from the group of resins consisting of polyvinyl acetal, aromatic polyimide, epoxy, polyurethane and polyester resins.

References Cited

UNITED STATES PATENTS

| 2,085,995 | 7/1937 | Patnode et al. | 117—218 |
| 3,191,286 | 6/1965 | Armstrong et al. | 117—75 X |
| 3,207,626 | 9/1965 | Lavin et al. | 117—218 |
| 3,220,882 | 11/1965 | Lavin et al. | 117—218 |

WILLIAM D. MARTIN, *Primary Examiner.*

R. HUSACK, *Assistant Examiner.*